United States Patent Office 3,231,570
Patented Jan. 25, 1966

3,231,570
NITROFURANS
Ralph George Haber, 6 Glickson St., Tel Aviv, Israel
No Drawing. Filed June 6, 1962, Ser. No. 200,322
Claims priority, application Israel, June 15, 1961,
15,633
9 Claims. (Cl. 260—240)

This invention relates to a new series of chemical compounds of the nitrofuran series. Nitrofuran derivatives are known antibacterial agents and some nitrofuran derivatives also have antifungal as well as antiprotozoal activity.

The members of the new series of compounds possess marked antibacterial activity, especially against staphylococcus aureus. These bacteria are a dangerous problem because they become resistant to antibiotics such as penicillin.

The new compounds are represented by the general formula $$NO_2-\underset{O}{\boxed{\phantom{x}}}-CH=N-NH-CO-NH-N=A$$

wherein A either represents two hydrogen atoms or is the group having the formula $$=C\begin{matrix}B\\ \diagup\\ \diagdown\\ H\end{matrix}$$

wherein B is an aryl, substituted aryl, heteroaryl or substituted heteroaryl radical.

More particularly, the compounds of the present invention have the formula $$NO_2-\underset{O}{\boxed{\phantom{x}}}-CH=N-NH-CO-NH-N=C\begin{matrix}B\\ \diagup\\ \diagdown\\ H\end{matrix}$$

wherein B is a member selected from the group consisting of phenyl, chlorophenyl, nitrophenyl, hydroxyphenyl, dimethylaminophenyl, methylpyridyl, furyl or nitrofuryl radicals.

The compounds of the invention are prepared by a process involving condensing 5-nitrofurfuraldehyde or a functional derivative thereof with carbohydrazide or with an aryl, heteroaryl, substituted aryl or substituted heteroaryl carbohydrazone or condensing 5-nitrofurfuralcarbohydrazone with an aryl, heteroaryl, substituted aryl or substituted heteroaryl aldehyde; two moles of the nitrofurfuraldehyde or a functional derivative thereof may be condensed with one mole of carbohydrazide thus producing the symmetrically substituted carbohydrazone.

The in vitro antibacterial activity of some of these compounds is illustrated in the following table, in the presence of 10% blood serum the activity decreases slightly.

TABLE OF MINIMAL INHIBITORY CONCENTRATION IN MG. PERCENT

| | Staph. aureus | Shigella | Salmonella | B. coli | Klebsiella | Proteus | Pseudomonas pyocyaneus | Candida albicans |
|---|---|---|---|---|---|---|---|---|
| 15-bis-(5-nitrofurfural)-carbohydrazone | 0.3 | 1-2.5 | 10 | 10 | 10->10 | 10->10 | 5-10 | 5-10 |
| 5-nitrofurfural-carbohydrazone | 2 | 2.5-5 | 2.5-5 | 5-10 | 5-10 | 10 | 10 | 5-10 |
| 1-(5-nitrofurfural)-5-benzaldehyde)-carbohydrazone | 0.3-0.5 | 5 | 5-10 | 2.5-5 | 10 | 10 | 10 | 10 |
| 1-(5-nitrofurfural)-5-(o-chlorobenzaldehyde)-carbohydrazone | 0.1-0.2 | 5-10 | 10 | 10 | 10 | 10 | 10 | 10 |
| 1-(5-nitrofurfural)-5-(p-nitrobenzaldehyde)-carbohydrazone | 0.1-0.2 | 10 | 10 | 10 | 10 | 10 | 10 | 10 |
| 1-(nitrofurfural)-5-(salicylaldehyde)-carbohydrazone | 2 | 5 | 5 | 5 | 10 | 10->10 | 10 | 10 |
| 1-(nitrofurfural)-5-furfural-carbohydrazone | 0.3-0.5 | 0.5 | 5-10 | 1 | 5-10 | 10->10 | 10 | 10 |

The new nitrofuran compounds are prepared by condensing 5-nitrofurfuraldehyde or a functional derivative thereof, such as its diacetate or exime, with the appropriate carbohydrazone or with carbohydrazide; alternatively, 5-nitrofurfural-carbohydrazone may be condensed with an appropriate aldehyde or ketone.

Such condensations can be carried out in solvents such as methanol, ethylene glycol or water. The addition of a little acid as catalyst is in most cases unnecessary.

The following examples are given to illustrate the manner in which the invention may be carried into effect.

EXAMPLE 1

5-nitrofurfural-carbohydrazone

To a boiling solution of 54.9 gm. carbohydrazide in 1000 ml. 90% methanol a solution of 48 gm. 5-nitrofural diacetate in 700 cc. methanol was added rapidly and mixed. The mixture was heated under reflux for 3 hours. A green precipitate crystallised out during the reaction. After cooling, 37 gm. of 5-nitrofurfural-carbohydrazone, M.P. 202–204° C., were obtained. From the mother liquid an additional 2.5 gm. was obtained on concentrating.

The product can be recrystallised from $H_2O$ or nitromethane, M.P. recrystallised 203–204.5° C.

*Analysis.*—Calculated: C, 33.78; H, 3.31. Found: C, 33.54; H, 3.62.

EXAMPLE 2

Symmetrical 5-nitrofurfural-bis-carbohydrazone 4.5 gm. carbohydrazide in 50 ml. water were added with stirring to a boiling solution of 24 gm. 5-nitrofurfural diacetate in 200 ml. methanol. To this solution 12 ml. concentrated sulphuric acid were added dropwise. Immediately the reaction mixture turned into a yellow thick mass. The mass was kept for one hour under mixing and reflux and then cooled and filtered.

The precipitate so obtained was washed with water until pH 7 was reached. The yield was 15.5 gm. of symmetrical 5-nitrofurfural-carbohydrazone, M.P. 260.5–261.5° C.

Analysis.—Calculated for $C_{11}H_8N_6O_7+H_2O$: C, 37.3; H, 2.83; N, 23.7. Found: C, 37.25; H, 2.80; N, 23.81.

EXAMPLE 3

*1-(5-nitrofurfural)-5-(furfural)-carbohydrazone*

3.84 gm. furfural were added with stirring to a boiling solution of 4.2 gm. 5-nitrofurfural-carbohydrazone in 1500 ml. distilled water. The colour of the solution changed from yellow to light brown, and after a few minutes a green precipitate crystallised out. The mixture was refluxed for two hours. After cooling, 4.5 gm. of 1-(5-nitrofurfural)-5-(2-furfural)-carbohydrazone was filtered off, M.P. 210–211° C.

Recrystallised from nitromethane yellow-greenish crystals were obtained melting at 211–212° C.

Another 0.4 gm. was recovered from the concentrated filtrate.

EXAMPLE 4

*1-(5-nitrofurfural)-5-(benzaldehyde)-carbohydrazone*

A mixture of 5-nitrofurfural-carbohydrazone (4.2 gm.) and benzaldehyde (2.2 gm.) in 1500 ml. distilled water were heated under reflux with stirring for two hours.

A green product crystallised out immediately on cooling. After cooling and filtering 5.4 gm. of product were obtained, M.P. 211–213° C., dec. Recrystallisation from toluene and nitromethane yielded a product melting at 214.5–215.5° C. with decomposition.

EXAMPLE 5

*1-(5-nitrofurfural)-5-(4-nitrobenzaldehyde)-carbohydrazone*

5-nitrofurfural-carbohydrazone (2.1 gm.) and p-nitrobenzaldehyde (1.6 gm.) in 600 ml. water were refluxed with stirring for two hours. Instantly on cooling a greenish yellow crystalline product precipitated out. After cooling and filtering, 3.2 gm. of 1-(nitrofurfural)-5-(4-nitrobenzaldehyde)-carbohydrazone, M.P. 217.5–218.5° C., were obtained, which when recrystallised from nitromethane melted at 218–219° C. with decomposition.

EXAMPLE 6

*1-(5-nitrofurfural)-5-(2-chlorobenzaldehyde)-carbohydrazone*

5-nitrofurfural-carbohydrazone (4.2 gm.) and o-chlorobenzaldehyde (3.1 gm.) in 1500 ml. distilled water were refluxed with stirring for two hours. A green precipitate crystallised out immediately on cooling. After cooling, 6.5 gm. of 1-(5-nitrofurfural)-5-(2-chlorobenzaldehyde)-carbohydrazone, M.P. 209.5–211.5° C., were obtained, which when recrystallised from nitromethane melted at 210–211.5° C., with decomposition.

EXAMPLE 7

*1-(5-nitrofurfural)-5-(4-chlorobenzaldehyde)-carbohydrazone*

2.9 gm. (2.4 cc.) p-chlorobenzaldehyde were added with stirring to a solution of 4.2 gm. 5-nitrofurfural-carbohydrazone in 1600 ml. water. The mixture was refluxed for one hour. After cooling, 6.3 gm. of yellow-greenish crystals were filtered off. M.P. 203–204.5° C. with decomposition.

After recrystallisation from a mixture of ethyl-acetate, toluene and nitromethane the product had M.P. 205–207° C.

Analysis.—Calculated: C, 46.4; H, 2.98; Cl, 10.6. Found: C, 46.27; H, 3.14; Cl, 10.1.

EXAMPLE 8

*1-(5-nitrofurfural)-5-(4-dimethylamino-benzaldehyde)-carbohydrazone*

5 grams of 4-dimethylamino-benzaldehyde in 30 ml. methanol were added with stirring to a solution of 4.2 gm. 5-nitrofurfural-carbohydrazone in 1500 ml. distilled water. The mixture was refluxed for five hours and cooled. Dark red crystals (6.2 gm.), M.P. 180–182° C., were filtered off, which when recrystallised three times from nitromethane had a M.P. of 196–198° C.

EXAMPLE 9

*1-(5-nitrofurfural)-5-(6-methyl-1-pyridine-2-aldehyde)-carbohydrazone*

5-nitrofurfural-carbohydrazone (4.2 gm.) and 2.6 gm. 6-methyl-1-pyridine-2-aldehyde in 1500 ml. distilled water were refluxed with stirring for two hours. A green product precipitated at once on cooling. After cooling and filtering, 5.8 gm. of 1-(5-nitrofurfural)-5-(6-methyl-1-pyridine-2-aldehyde)-carbohydrazone, M.P. 185–188° C. with decomposition, were obtained.

EXAMPLE 10

*1-(5-nitrofurfural)-5-(2-chlorobenzaldehyde)-carbohydrazone* o-Chlorobenzaldehyde carbohydrazone (M.P. 242–244° C.) (2.1 gm.) and nitrofurfural (distilled) (1.4 gm.) in 200 cc. methanol were refluxed for four hours with stirring. The excess methanol was distilled off and an orange product of 1-(5-nitrofurfural)-5-(2-chlorobenzaldehyde)-carbohydrazone, M.P. 209–210° C., was obtained. Yield: 2.7 gm.

I claim:
1. Symmetrical 5-nitrofurfural-bis-carbohydrazone.
2. 1-(5-nitrofurfural)-5-(furfural)-carbohydrazone.
3. 1 - (5 - nitrofurfural) - 5 - (benzaldehyde) - carbohydrazone.
4. 1 - (5 - nitrofurfural) - 5 - (4 - nitrobenzaldehyde) - carbohydrazone.
5. 1 - (5 - nitrofurfural) - 5 - (2 - chlorobenzaldehyde) - carbohydrazone.
6. 1 - (5 - nitrofurfural) - 5 - (4 - chlorobenzaldehyde) - carbohydrazone.
7. 1 - (5 - nitrofurfural) - 5 - (4 - dimethylamino-benzaldehyde) - carbohydrazone.
8. 1 - (5 - nitrofurfural) - 5 - (6 - methyl - 1 - pyridine-2-aldehyde) - carbohydrazone.
9. A compound having the formula

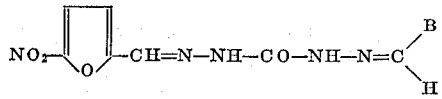

wherein B is a member selected from the group consisting of phenyl, chlorophenyl, nitrophenyl, hydroxyphenyl, dimethylaminophenyl, methylpyridyl, furyl and nitrofuryl.

References Cited by the Examiner
UNITED STATES PATENTS
3,058,988  10/1962  Von Esch et al. _____ 260—347.3

FOREIGN PATENTS
620,888  3/1949  Great Britain.

(Other references on following page)

OTHER REFERENCES

Chemical Abstracts, vol. 20, pages 1810–1811 (1926) [abstract of Guha et al., Quart. J. Indian Chemical Soc., vol. 2, pages 225–39 (1925)].

Derwent: Belgian Patents Report, vol. 1, No. 78A, page A10 (Aug. 4, 1961) [abstract of Belgian Patent 600,201, patented May 16, 1961].

Elsevier: "Chemistry of Carbon Compounds," vol. IB (Aliphatic Compounds), pages 918 to 919 and 928 to 929, Elsevier Publishing Co., Amsterdam, Holland (1952).

Koschucharov et. al: Pharmazie, vol. 15, pages 492–7 (1960) [relied upon as abstracted in Chemical Abstracts, vol. 56, col. 11,712f, and Subject Index, page 468s, referring to abstract to 11,712f (1962)].

WALTER A. MODANCE, *Primary Examiner*.

NICHOLAS S. RIZZO, *Examiner*.